US011295017B2

(12) United States Patent
Madrid et al.

(10) Patent No.: US 11,295,017 B2
(45) Date of Patent: Apr. 5, 2022

(54) OVER-THE-AIR UPDATES SECURITY (71) Applicant: FORD GLOBAL TECHNOLOGIES, LLC, Dearborn, MI (US)

(72) Inventors: Daniel Joseph Madrid, Livonia, MI (US); Sangeetha Sangameswaran, Canton, MI (US); Jason Michael Miller, Woodhaven, MI (US); John Naum Vangelov, South Lyon, MI (US); Aldi Caushi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 15/420,373

(22) Filed: Jan. 31, 2017

(65) Prior Publication Data
US 2018/0217828 A1  Aug. 2, 2018

(51) Int. Cl.
*G06F 8/65* (2018.01)
*H04L 9/32* (2006.01)
*H04L 29/06* (2006.01)
*H04W 12/06* (2021.01)
*G06F 21/57* (2013.01)
*H04L 9/08* (2006.01)
*H04W 12/03* (2021.01)
*H04W 12/106* (2021.01)

(52) U.S. Cl.
CPC ............... *G06F 21/57* (2013.01); *G06F 8/65* (2013.01); *H04L 9/0819* (2013.01); *H04L 9/0891* (2013.01); *H04L 9/3247* (2013.01); *H04L 63/0428* (2013.01); *H04L 63/123* (2013.01); *H04W 12/03* (2021.01); *H04W 12/06* (2013.01); *H04W 12/106* (2021.01); *H04L 2209/80* (2013.01); *H04L 2209/84* (2013.01); *Y02T 10/62* (2013.01)

(58) Field of Classification Search
CPC .......... G06F 21/57; G06F 8/65; H04W 12/03; H04W 12/106; H04W 12/06; H04W 8/245; H04W 12/04; H04W 24/02; H04L 63/123; H04L 9/0891; H04L 9/0819; H04L 9/3247; H04L 63/0428; H04L 2209/80; H04L 2209/84; H04L 67/34; Y02T 10/62
See application file for complete search history.

(56) References Cited

U.S. PATENT DOCUMENTS 9,253,166 B2    2/2016  Gauda
9,276,752 B2 *  3/2016  Abraham ................ G06F 21/57
2009/0119657 A1 * 5/2009  Link, II .................... G06F 8/65
                                                    717/171

(Continued)

FOREIGN PATENT DOCUMENTS

JP          2011244321 A  * 12/2011
WO  WO-2016191176 A1 * 12/2016  ............ H04W 12/35

*Primary Examiner* — Daxin Wu
(74) *Attorney, Agent, or Firm* — Michael Spenner; Brooks Kushman P.C.

(57) ABSTRACT

A system for a vehicle includes a controller configured to receive encrypted software updates including a first signature, decrypt the received software updates using a decryption key received with update instructions indicative of available software updates, and install the decrypted updates in response to detecting that the first signature matches a second signature generated by the controller using a signature verification key.

14 Claims, 4 Drawing Sheets

(56) References Cited

U.S. PATENT DOCUMENTS

| | | | | |
|---|---|---|---|---|
| 2011/0320089 A1* | 12/2011 | Lewis | .................. | H04W 12/041 |
| | | | | 701/29.6 |
| 2013/0111212 A1* | 5/2013 | Baltes | ...................... | G06F 21/64 |
| | | | | 713/176 |
| 2013/0173112 A1* | 7/2013 | Takahashi | ............. | H04W 12/04 |
| | | | | 701/36 |
| 2013/0318357 A1* | 11/2013 | Abraham | ................. | G06F 21/57 |
| | | | | 713/176 |
| 2014/0032916 A1* | 1/2014 | Costin | ................... | G06F 21/572 |
| | | | | 713/176 |
| 2015/0229471 A1* | 8/2015 | Nair | ...................... | H04L 9/0897 |
| | | | | 713/171 |
| 2016/0013934 A1* | 1/2016 | Smereka | ............. | G06F 21/572 |
| | | | | 713/171 |
| 2016/0170733 A1* | 6/2016 | Martin | ...................... | G06F 8/65 |
| | | | | 713/191 |

* cited by examiner

OVER-THE-AIR UPDATES SECURITY

TECHNICAL FIELD

The present disclosure relates to systems and methods for securing over-the-air (OTA) software updates provided to a plurality of vehicle controllers.

BACKGROUND

One or more software and/or hardware components of a vehicle may require periodic or occasional electronic updates. In one example, the updates may include changes to the software or settings of the vehicle to address an issue or to provide improved functionality to current software or settings. In another example, the updates may include updated configuration settings for one or more vehicle controllers and/or updated versions of software or firmware to be installed on the one or more vehicle controllers.

The vehicle may be configured to receive electronic updates via a wired or a wireless connection. In one example, a technician at a car dealership or a service shop may download the updates onto the vehicle using a wired land access network (LAN) connection. In another example, the vehicle may be configured to receive over-the-air (OTA) software updates, such as software updates received via a wireless connection to a server.

SUMMARY

A system for a vehicle includes a controller configured to receive encrypted software updates including a first signature, decrypt the received software updates using a decryption key received with update instructions indicative of available software updates, and install the decrypted updates in response to detecting that the first signature matches a second signature generated by the controller using a signature verification key.

A method for a vehicle includes decrypting software updates, downloaded from an update server, using a decryption key received from the update server as a part of update instructions specifying the software updates and including a first signature, and installing the decrypted updates in response to detecting that the first signature matches a second signature generated by the controller using a signature verification key received from the update server.

A system for a vehicle includes a telematics controller configured to download, from an update server, software updates to apply to a vehicle controller specified by instructions received by the telematics controller responsive to detecting that a vehicle identifier included in the instructions matches a vehicle identifier assigned to the vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A plurality of controllers performing a variety of functions on a vehicle may be configured to receive periodic or occasional software and firmware (referred to herein generally as software) updates. As some non-limiting examples, the software updates may help address efficiency issues, functionality changes, and security vulnerabilities in the vehicles out in the field or in customer's hands.

Software update files for installing in several vehicle controllers may be protected from unauthorized intrusion using a variety of security methods. In one example, a cloud server manager may encrypt the software update files using a public or a private encryption key. Each of the software update files may further be code signed, such that decoding may be performed at the corresponding vehicle controller, rather than, for example, at a telematics control unit (TCU). The cloud server manager may send to the vehicle an instructions file including a listing and location of the software updates available for download. The instructions may further include data for decrypting the software updates by the controller receiving the software update. In some instances, the cloud server manager may encode the instructions file to be vehicle-specific, such that only the vehicle whose controllers will be receiving the updates is capable of interpreting the instructions.

Figure 1:
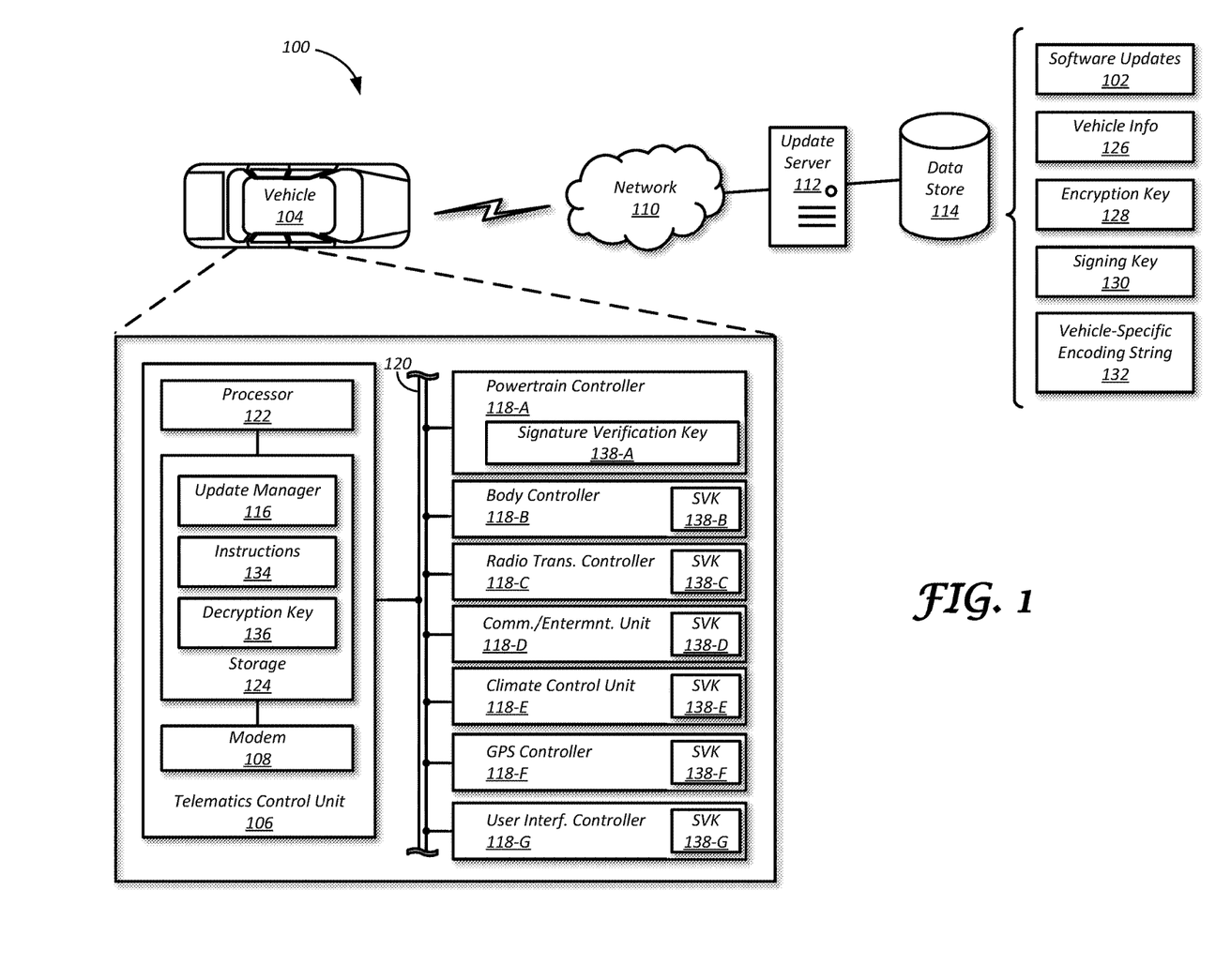
FIG. 1 is a block diagram illustrating a system for securing software updates provided to vehicle controllers.

FIG. 1 illustrates an example system 100 for providing software updates 102 to a vehicle 104. The vehicle 104 may include a telematics control unit (TCU) 106 having a modem 108 in communication over a network 110 with an update server 112 (e.g., directly, or via a mobile device of a vehicle occupant). The update server 112 may communicate with a data store 114 configured to maintain software updates 102 for download. The system 100 may further include a software update manager 116 installed to the vehicle 104 and configured to install software updates 102 to the TCU 106 itself or to other controllers 118 of the vehicle 104. While an example system 100 is shown in FIG. 1, the example components illustrated in the Figure are not intended to be limiting. Indeed, the system 100 may have more or fewer components, and additional or alternative components and/or implementations may be used.

The vehicle 104 may include various types of automobile, crossover utility vehicle (CUV), sport utility vehicle (SUV), truck, recreational vehicle (RV), boat, plane or other mobile machine for transporting people or goods. In many cases, the vehicle 104 may be powered by an internal combustion engine. As another possibility, the vehicle 104 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 104 may vary, the operating characteristics of the vehicle 104 may correspondingly vary. As some other possibilities, vehicle 104 may have different characteristics with respect to passenger capacity, towing ability and capacity, and storage volume.

When the vehicle 104 is assembled, the vehicle 104 may include various hardware and software components, such as, but not limed to, the one or more vehicle controllers 118 (represented as discrete controllers 118-A through 118-G). The controllers 118 may be configured to monitor and manage various vehicle 104 functions under the power of the vehicle battery and/or drivetrain. The controllers 118 may, accordingly, include one or more processors (e.g., microprocessors) (not shown) configured to execute firmware or software programs stored on one or more storage devices (not shown) of the controller 118. While the controllers 118 are illustrated as separate components, the vehicle controllers 118 may share physical hardware, firmware, and/or software, such that the functionality from multiple controllers 118 may be integrated into a single controller 118, and that the functionality of various such controllers 118 may be distributed across a plurality of controllers 118.

The vehicle controllers 118 may, for example, include, but are not limited to, a powertrain controller 118-A configured to manage engine operating components, a body controller 118-B configured to manage various power control functions such as exterior lighting, interior lighting, keyless entry, remote start, and point of access status verification, a radio transceiver controller 118-C configured to communicate with key fobs, mobile devices, or other local vehicle 104 devices, an entertainment controller 118-D configured to support voice command and BLUETOOTH interfaces with the driver and driver carry-on devices, a climate control management controller 118-E configured to monitor and manage heating and cooling system components (e.g., compressor clutch, blower fan, temperature sensors, etc.), a global positioning system (GPS) controller 118-F configured to provide vehicle location information, and a human-machine interface (HMI) controller 118-G configured to receive user input via various buttons or other controls, as well as provide vehicle status information to a driver.

A vehicle bus 120 may include various methods of communication available between the vehicle controllers 118, as well as between the TCU 106 and the vehicle controllers 118. The vehicle bus 120 may further include one or more of a vehicle controller area network (CAN), an Ethernet network, and a media oriented system transfer (MOST) network.

The TCU 106 may include one or more processors 122 (e.g., microprocessors) configured to execute firmware or software programs stored on one or more storage devices 124 of the TCU 106. The TCU 106 may further include network hardware, e.g., the modem 108, configured to facilitate communication between the vehicle controllers 118 and to facilitate communication between the vehicle 104 and other devices of the system 100 via the network 110. The network 110 may include one or more interconnected communication networks such as the Internet, a cable television distribution network, a satellite link network, a local area network, a wide area network, and a telephone network, as some non-limiting examples. As another example, the TCU 106 may be configured to communicate via one or more of Bluetooth, Wi-Fi, and wired USB network connections and facilitate data transmission between the network 110 and a mobile device (not shown).

The data store 114 may be configured to store the software updates 102. The software updates 102 may include changes to the software or settings of the vehicle 104 to address an issue with the current software or settings, or to provide improved functionality to the current software. The software updates 102 may include, for example, updated configuration settings for one or more vehicle controllers 118, and/or updated versions of software or firmware to be installed on one or more vehicle controllers 118. In some cases, the software updates 102 may include a single data segment, while in other cases the software updates 102 may be organized into multiple segments, elements, or chunks, all of which may need to be downloaded in order to complete the overall software update 102 to be installed.

The data store 114 may be configured to store information indicative of the compatibility of the software updates 102 with specifications of the vehicle 104. For instance, a storage entry for the software update 102 may indicate that the software update 102 is compatible with a particular make and model of the vehicle 104, or that it is associated with a particular version(s) of the vehicle controller 118.

The data store 114 may further be configured to store additional information regarding the software updates 102. For example, the data store 114 may be configured to identify which software updates 102 correspond to which vehicle controllers 118. The update server 112 may be configured to append additional information to each of the software updates 102, or one or more sub-sections of the software updates 102, such that each of the software updates 102 may be identified as authentic by the respective controller 118.

Vehicle information 126 may include information configured to identify the vehicle 104 or the configuration of the vehicle 104. For example, the vehicle information 126 may include a vehicle identification number (VIN) published to the vehicle bus 120, or subscriber identity module (SIM) information of the modem 108 such as international mobile station equipment identity (IMEI). Additionally or alternately, the vehicle information 126 may include version information for at least a portion of the hardware and software components of the vehicle controllers 118 of the vehicle 104.

The update server 112 may be configured to apply one or more security techniques to protect the software updates 102 from unauthorized intrusion or tempering, ensure that the available software updates 102 are routed to and authenticated by the vehicle controller 118 for which they are intended, limit receipt of the software updates 102 to receipt by the vehicle 104 for which they are intended, and so on.

For example, the update server 112 may be configured to receive requests for available software updates 102 from the vehicle 104. The requests may include the vehicle information 126 allowing the update server 112 to query the data store 114 for the software updates 102 associated with the vehicle 104 as it is currently configured. The update server 112 may provide, responsive to the requests, indications of the available software updates 102 (or the software updates 102 themselves) to update the requesting vehicle 104.

The data store 114 may also be configured to store encryption keys 128 generated by the update server 112. The update server 112 may generate the encryption keys 128 and the corresponding decryption keys 136 in response to detecting that the software updates 102 are available. The update server 112 may use the encryption keys 128 to encrypt the available software updates 102 and may send the decryption keys 136 to the vehicle 104 such that the vehicle 104 may decrypt the downloaded software updates 102.

The encryption key 128 may be a random or pseudorandom string of bytes generated according to one or more encryption schemes. As an example, the encryption schemes may include symmetric, asymmetric, and cryptographic hash algorithms, including, but not limited to, Data Encryption Standard (DES), Triple DES (3DES), Advanced Encryption Standard (AES), the International Data Encryption Algorithm (IDEA), the Secure Hash Algorithm, and Pretty Good Privacy (PGP). Additionally or alternatively, the encryption keys 128 and the corresponding decryption keys 136 may be indexed according to the vehicle information 126, e.g., VIN provided to the data store 114 as part of the vehicle information 126, or in other cases indexed according to the vehicle controller 118 for which the software update 102 is intended.

The one or more of the data segments of the software updates 102 may be further code signed by the update server 112, such that the software updates 102 may be recognized by the controller 118 being updated. The data store 114 may be configured to store signature keys 130 and signature verification keys 138 generated by the update server 112. The update server 112 may use the signature keys 130 to sign the software updates 102, prior to the download of the updates 102 by the vehicle 104, and may distribute the corresponding signature verification keys 138 to the controllers 118 for use during a signature verification process.

The data store 114 may also be configured to store vehicle-specific encoding strings 132, or data strings indicating the specific vehicle 104 for which the available software updates 102 are intended. The vehicle-specific encoding strings 132 may, for instance, be indexed according to the vehicle information 126, e.g., VIN provided to the data store 114 as part of the vehicle information 126. As described further below, the update server 112 may use the encoding strings 132 to encode one or more transmissions to the vehicle 104 such that only the vehicle 104 for which the transmissions are intended is able to interpret them.

The update manager 116 of the vehicle 104 may be configured to manage the installation of the software updates 102 to the vehicle 104. The update manager 116 may be configured to utilize the TCU 106 access to the vehicle bus 120 to communicate with the vehicle controllers 118. Upon or after assembly of the vehicle 104, the update manager 116 may be configured to query for existence and version information for at least a portion of the hardware and software components defining the vehicle controllers 118. In one example, the update manager 116 may trigger a periodic check for new software updates 102. In another example, the update manager 116 may receive a command from a user indicative of a request to check for the software updates 102.

When triggered, the update manager 116 may be configured to send an update request to the update server 112 to inquire whether software updates 102 for the vehicle 104 are available. For example, the update manager 116 may query the update server 112 using the vehicle information 126 (or, if the data store 114 maintains current vehicle information 126, an identifier of the vehicle 104), and may receive a response from the update server 112 indicative of whether new software updates 102 for the vehicle 104 are available (e.g., an instruction file 134 including links or other identifiers of the software updates 102 for the vehicle 104 to download). The instruction file 134 may be secured using the vehicle-specific encoding string 132, such that the instruction file 134 may be read and interpreted by the specific vehicle 104 for which the software updates 102 are intended.

If the response to the update manager 116 indicates the software updates 102 are available for the vehicle 104, the update manager 116 may be further configured to download and install the indicated updates 102, or in other cases queue the software updates 102 to be downloaded and installed. For instance, the update manager 116 may be configured to receive the instructions 134 including a listing of the software updates 102 identified by the update server 112 as being available. The update manager 116 may be further configured to detect when the vehicle 104 is connected to the network 110, e.g., via the modem 108, and download the software update 102 when connected. The update manager 116 may be further configured to send the downloaded software updates 102, e.g., via the vehicle bus 120, for installation by the corresponding vehicle controllers 118.

In one example, the instructions 134 may be encoded using the encoding strings 132 such that only the update manager 116 of the vehicle 104 for which the transmissions are intended is able to interpret them. The update manager 116 may disregard the instructions 134 in response to determining that it does not recognize the encoding string 132 used to encode the instructions 134.

In another example, the instructions 134 from the update server 112 may include links to the software updates 102 that have been encrypted. The instructions 134 may, accordingly, include decryption keys 136 for decrypting the downloaded software updates 102. The update manager 116 may be further configured to send the decryption keys 136 received with the instructions 134 to the corresponding vehicle controllers 118 for later use with the encrypted software updates 102.

Figure 2:
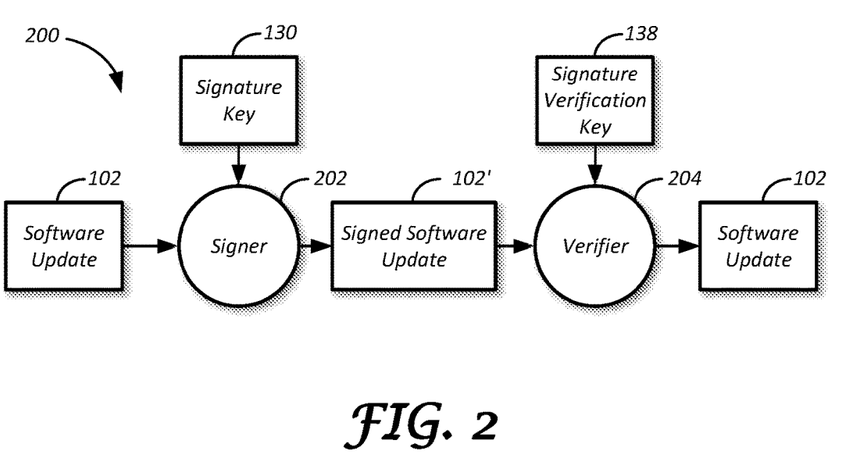
FIG. 2 is a block diagram illustrating a system for encrypting the software updates sent over-the-air.

FIG. 2 illustrates an example diagram 200 of signing the software update 102 prior to downloading by the vehicle 102 and verifying the signature after download of the software update 102. As shown, a signer 202 may be configured to generate a signed software update 102' from the software update 102 using the signature key 130. Moreover, a verifier 204 may be configured to verify that the signature generated using the signature verification key 138 of the vehicle controller 118 matches the signature included with the software update 102. In an example, the update server 112 may perform the operations of the signer 202 on the software update 102 before providing the signed software update 102' to the vehicle 104, and the vehicle controller 118 may perform the operations of the verifier 204 on the received signed software updates 102' prior to installation to the vehicle controller 118.

The update server 112 may generate the signature key 130 and the corresponding signature verification key 138 for distribution to the one or more vehicle controllers 118 of the vehicle 104 for which the software updates 102 are available. The update server 112 may further include the corresponding signature verification keys 138 with the instructions 134 sent to the update manager 116 for distribution to the vehicle controller 118. Prior to transmission of the requested software update 102 to the vehicle 104, the update server 112 may sign one or more portions of the software update file 102, such as, but not limited to, the file or segment header, using the generated signature key 130. The update manager 116 may download and send the signed software updates 102' to the corresponding controllers 118 of the vehicle 104.

The vehicle controller 118 may, accordingly, use the signature verification process to verify that the received software updates 102 are intended for the vehicle controller 118 prior to the installation. The vehicle controller 118 may use the signature verification key 138 to generate a controller signature and may further verify that the signature included with the downloaded signed software updates 102' matches the signature generated by the vehicle controller 118. If the received and generated signatures do not match, the vehicle controller 118 may be configured to send an error notification. The vehicle controller 118 may be further configured to install the received software updates 102 in response to detecting that the received and the generated signatures match. In an example, the update server 112 may be configured to encrypt the signed software updates 102' using the encryption key 128 and may transmit the encrypted signed software updates 102" to the vehicle 104.

Figure 3:
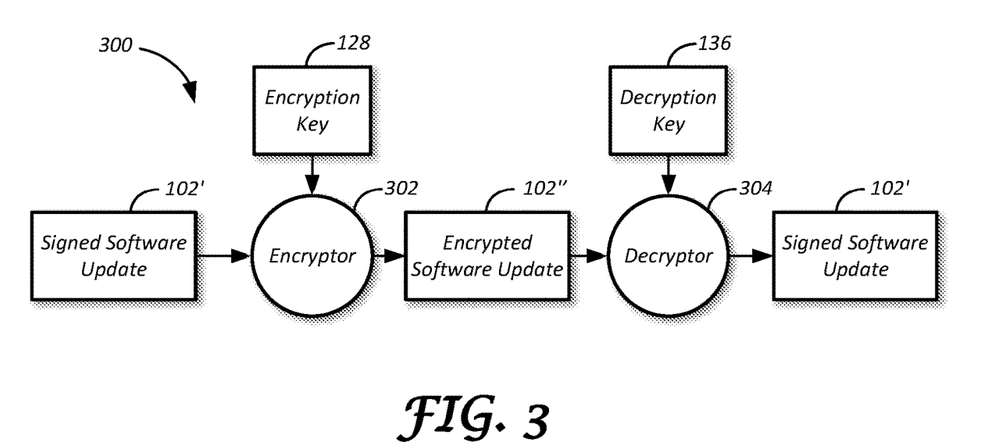
FIG. 3 is a block diagram illustrating a system for verifying controller signature included with the software updates.

FIG. 3 illustrates an example diagram 300 of encryption and decryption of the software update 102. The update server 112 may generate the encryption key 128 and the corresponding decryption key 136 in response to detecting that the software updates 102 are available for the one or more controllers 118 of the vehicle 104. The update server 112 may, accordingly, send the generated decryption key 136 to the update manager 116 of the vehicle 104 as part of the instruction file 134.

The update server 112 performing operations of an encryptor 302 may be configured to generate an encrypted signed software update 102" using the signed software update 102' and the encryption key 128. Prior to download of the requested software update 102 by the vehicle 104, the update server 112 may encrypt the software update 102 using the generated encryption key 128. The update server 112 may, for example, combine a single segment of the generated encryption key 128, such as a first segment or a segment following a key offset into the encryption key 128, with a single, e.g., first, segment of the software update 102.

The update server 112 may send to the vehicle 104 the decryption key 136 corresponding to the generated encryption key 128 as part of the instructions 134. The update manager 116 receiving the instructions 134 may send the included decryption keys 136 to the corresponding controller 118 prior to downloading the encrypted signed software updates 102". Additionally or alternatively, the update manager 116 may store, e.g., in the storage 124, the decryption keys 136 included as part of the instructions 134 and may decrypt the downloaded encrypted signed software updates 102" prior to sending the files the corresponding controllers 118.

The vehicle controller 118 may perform operations of a decryptor 304 and may regenerate the signed software update 102' using the encrypted signed software update 102" and the decryption key 136 received from the update manager 116. Additionally or alternatively, the vehicle controller 118 may receive the signed software update 102' that has been previously decrypted by the update manager 116 using the decryption key 136. As previously described in reference to FIG. 2, the vehicle controller 118 may use the signature verification key 138 to verify that the signed software update 102' is intended for the controller 118.

Figure 4:
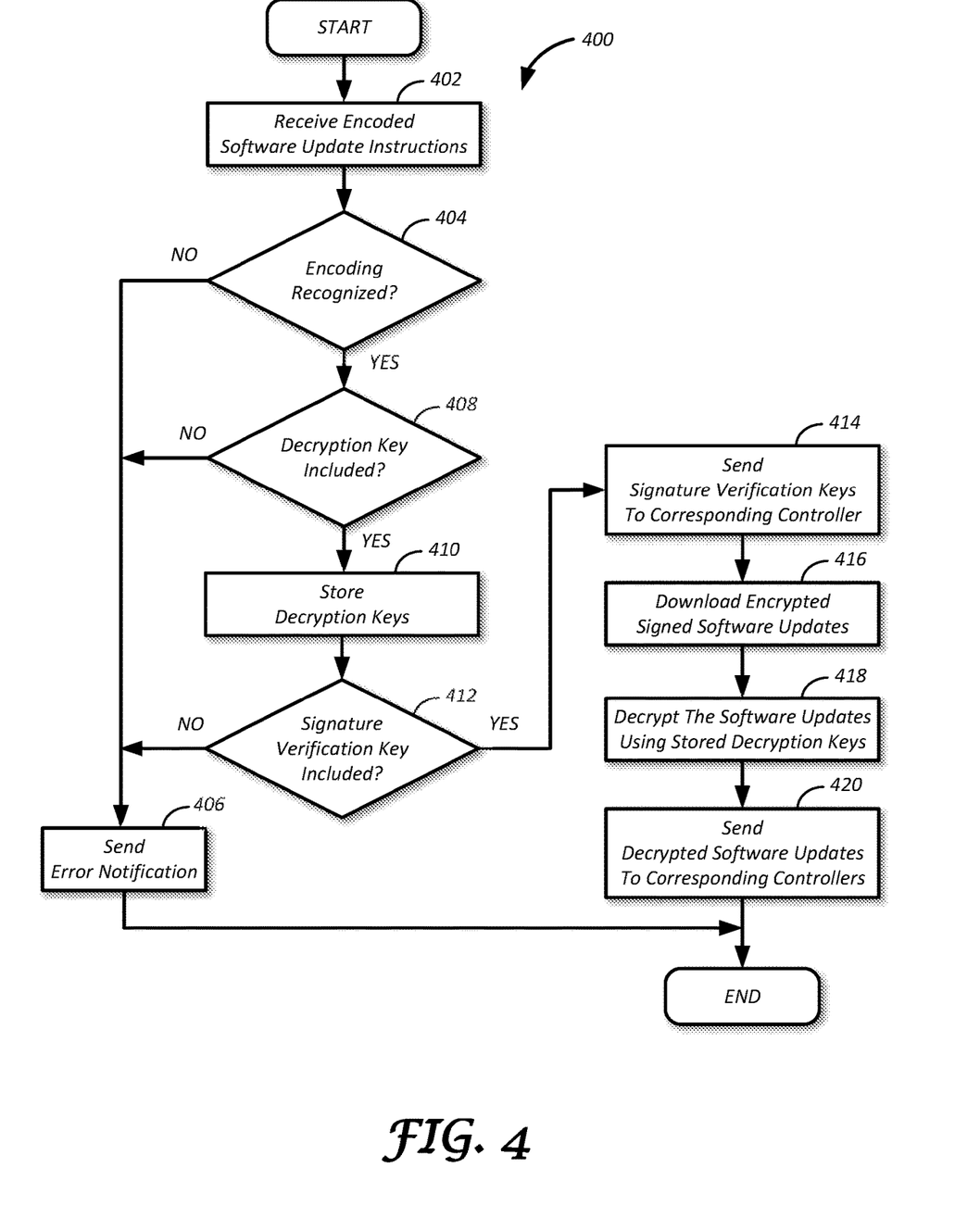
FIG. 4 is a flowchart illustrating an algorithm for receiving and distributing decryption keys and signature verification keys.

Referring to FIG. 4, an example process 400 for decrypting the encrypted software updates 102 using the decryption keys 136 is illustrated. The process 400 may begin at block 402 where the update manager 116 of the vehicle 104 receives, from the update server 112, the instructions 134 indicative of the location of the software updates 102 available for the one or more controllers 118. The update manager 116 determines, at block 404, whether the encoding string 132 used to encode the instructions 134 is recognized. The update manager 116 may disregard the instructions 134 and exit the process 400 in response to determining that the encoding string 132 is not recognized. Prior to exiting the process 400, at block 406, the update manager 116 may send an error notification indicating that the received instructions 134 could not be interpreted.

In response to recognizing the encoding string 132, the update manager 116, at block 408, determines whether the instructions 134 include the decryption keys 136 for decrypting the downloaded software updates 102. The update manager 116 sends an error notification, at block 406, and exists the process 400 in response to determining that the decryption keys 136 are not included as part of the instructions 134 from the update server 112.

In response to determining that the received instructions 134 include the decryption keys 136, the update manager 116, at block 410, stores the received decryption keys 136 in the storage 124 for future use with the encrypted signed software updates 102". Alternatively, the update manager 116 may send the received decryption keys 136 to the corresponding vehicle controllers 118.

At block 412, the update manager 116 determines whether the received instructions 134 include one or more signature verification keys 138 for the corresponding controller 118 receiving the software updates 102. In response to determining that the signature verification keys 138 were not received as part of the instructions 134, the update manager 116 may send an error notification, at block 406, and may then exit the process 400. At block 414, the update manager 116 sends the received signature verification keys 138 to the corresponding controllers 118 for use during the verification process.

At block 416, the update manager 116 downloads the encrypted signed software updates 102" according to the received instructions 134. The update manager 116 decrypts the encrypted signed software updates 102" using the stored decryption keys 136, at block 418. The update manager 116, at block 420, sends the downloaded encrypted signed software updates 102" to the corresponding vehicle controller 118. At this point the process 400 may end. Additionally or alternatively, if the update manager 116 previously sent the decryption keys 136 to the corresponding vehicle controller 118, the update manager 116 may send the encrypted signed software updates 102" for decryption by the vehicle controllers 118. In some examples, the process 400 may be repeated in response to the update manager 116 receiving the instructions 134 for available software updates 102 or in response to receiving another signal or request.

Figure 5:
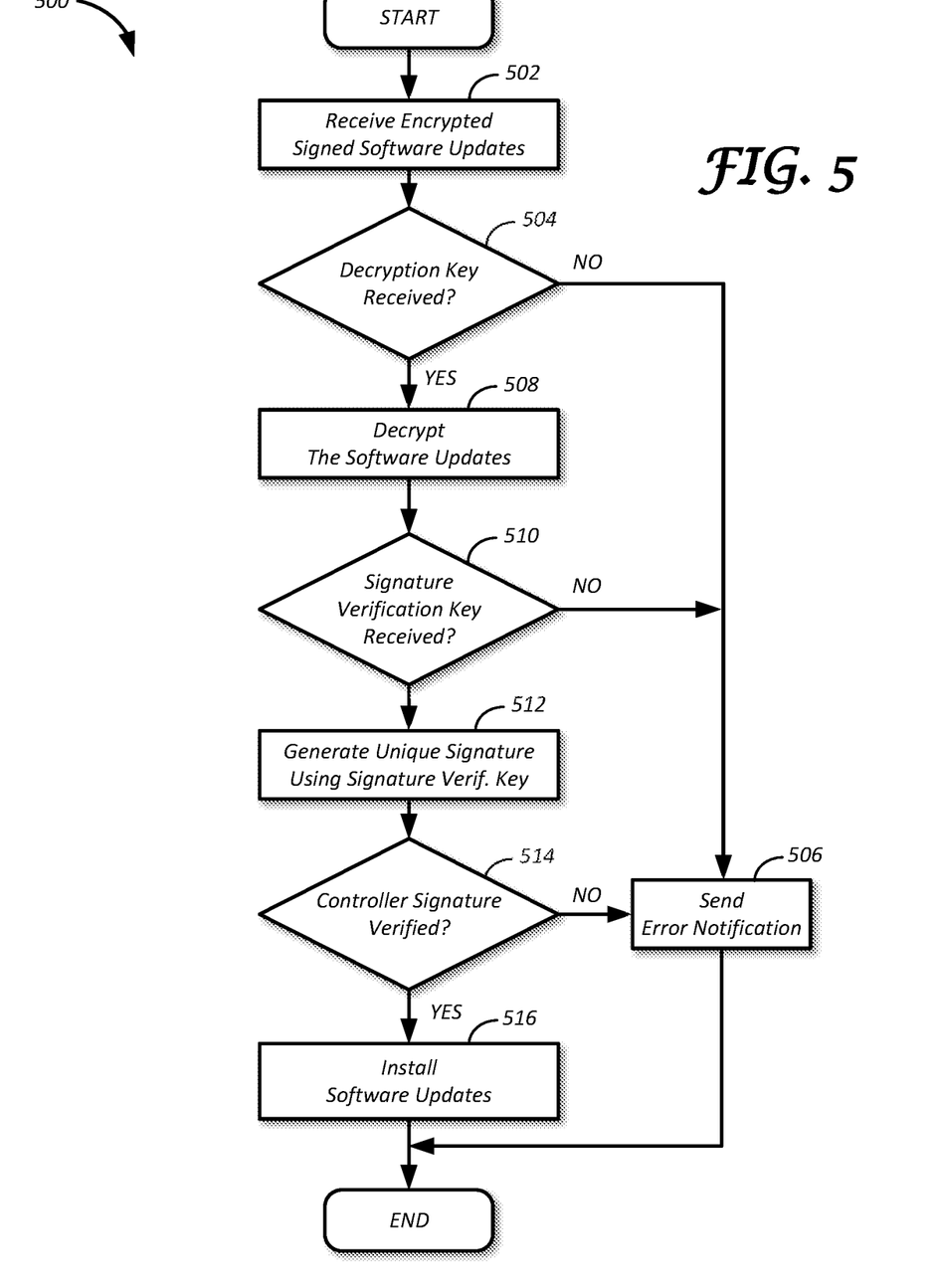
FIG. 5 is a flowchart illustrating an algorithm for decrypting encrypted software updates and performing a signature verification.

FIG. 5 illustrates an example process 500 for decrypting the encrypted software updates 102 and verifying that the received software updates 102 are intended for the vehicle controller 118. The process 500 may begin at block 502 where the controller 118 receives the encrypted signed software updates 102" from the update manager 116. In one example, the controller 118 may receive the encrypted signed software updates 102" in response to a determination that the software updates 102 are available for one or more controllers 118 of the vehicle 104.

The controller 118, at block 504, determines whether the decryption key 136 has been previously received from the update manager 116. In response to determining that the decryption key 136 has not been previously received, the vehicle controller 118, at block 506, sends an error notification indicating that the received encrypted signed software updates 102" could not be decrypted. If the decryption key 136 is identified, the vehicle controller 118 may use the decryption key 136 to decrypt the encrypted signed software updates 102" and generate the signed software update 102', at block 508. In a scenario where the update manager 116 decrypts the encrypted signed software updates 102" prior to sending the update 102 files to the corresponding controller 118, the process 500 may proceed to block 510 in response to receiving the decrypted software updates 102.

At block 510, the controller 118 determines whether the signature verification key 138 has been previously received from the update manager 116. The controller 118 may send an error notification, at block 506, in response to determining that the signature verification key 138 has not been previously received.

The controller 118 performs a signature verification in response to identifying the received signature verification key 138. At block 512, the controller 118 uses the signature verification key 138 to generate a unique signature. The controller 118, at block 514, verifies that the generated unique signature matches the signature included as part of the received signed software updates 102'. The controller 118 may send an error notification, at block 506, indicating that the controller signature could not be verified in response to determining that the signature included as part of the received update 102 does not match the generated signature.

At block 516, the controller 118 installs the software updates 102 responsive to determining that the signature included as part of the received signed software updates 102' matches the signature generated using the signature verification key 138. At this point the process 500 may end. In some examples, the process 500 may be repeated in response to the vehicle controller 118 receiving the encrypted signed software update 102" or in response to receiving another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
    a vehicle controller having a hardware processor; and
    a telematics controller programmed to:
        responsive to receiving an update instruction indicative of an available software update for the vehicle controller and including a decryption key and a signature verification key, send the signature verification key to the vehicle controller, wherein the update instruction is secured using a vehicle-specific encoding string indexed using a first vehicle identifier, and the decryption key is indexed using a second vehicle identifier,
        responsive to receiving the software update that is encrypted and signed, decrypt the software update using the decryption key and send the software update as decrypted to the vehicle controller, and
    the vehicle controller is programmed to:
        responsive to receiving the signature verification key and the software update as decrypted, verify a signature of the software update, and
        responsive to a successful verification, install the software update to the vehicle controller.

2. The system of claim 1, wherein the update instruction further include a vehicle identifier and the controller receives the encrypted signed software updates in response to detecting that the vehicle identifier matches stored identifier of the vehicle.

3. The system of claim 2, wherein the controller is further configured to disregard the update instruction and forego receiving the encrypted signed software updates in response to detecting that the vehicle identifier differs from the stored identifier of the vehicle.

4. The system of claim 1, wherein the controller is further configured to receive the signature verification key with the update instruction.

5. The system of claim 1, wherein the controller is further configured to receive the software updates from an update server configured to sign the software updates prior to sending the updates to the controller using a signature key corresponding to the signature verification key.

6. The system of claim 5, wherein the update server is further configured to encrypt the software updates using an encryption key prior to sending the updates to the controller.

7. The system of claim 1, wherein the first vehicle identifier includes a vehicle identification number (VIN), and the second vehicle identifier includes at least one of a subscriber identity module (SIM) information or an international mobile station equipment identity (IMEI).

8. A method for a vehicle comprising:
    receiving, via a telematics controller, from a server, an update instruction indicative of available software updates for a vehicle controller and including a decryption key and a signature verification key, wherein the update instruction is secured using a vehicle-specific encoding string indexed using a first vehicle identifier, and the decryption key is indexed using a second vehicle identifier;

sending the signature verification key to the vehicle controller;

responsive to receiving the software updates including a first signature, decrypting, via the telematics controller, the software updates using the decryption key; and installing the decrypted updates in response to detecting that the first signature matches a second signature generated by the controller using a signature verification key received from the update server.

9. The method of claim 8, wherein the update instruction further include a vehicle identifier and further comprising receiving the software updates in response to detecting that the vehicle identifier matches a vehicle identifier assigned to the vehicle.

10. The method of claim 9 further comprising disregarding the update instruction and foregoing the receiving of the encrypted signed software updates in response to detecting that the vehicle identifier differs from the identifier assigned to the vehicle.

11. The method of claim 8, wherein the signature verification key is generated by the update server.

12. The method of claim 8, wherein the encrypted signed software updates as received via a network connection with an update server configured to sign the software updates using a signature key prior to sending the updates.

13. The method of claim 12, wherein the update server is further configured to encrypt the software updates using an encryption key prior to sending the updates.

14. The method of claim 8, wherein the first vehicle identifier includes at least one of a subscriber identity module (SIM) information or an international mobile station equipment identity (IMEI); and the second vehicle identifier inclues a vehicle identification number (VIN).

* * * * *